United States Patent [19]

Alley et al.

[11] 4,335,891
[45] Jun. 22, 1982

[54] GAME TRANSPORTATION DEVICE

[76] Inventors: Francis P. Alley, DeVite Trailer Park, Lot 3, Edinburg, Pa. 16116; Michael T. Duffee, S. Beaver St., New Castle, Pa. 16101

[21] Appl. No.: 134,942

[22] Filed: Mar. 28, 1980

[51] Int. Cl.³ .................. B62B 15/00; B62B 17/08
[52] U.S. Cl. .................................. 280/19; 224/921; 280/12 AB
[58] Field of Search ............... 280/12 R, 24, 18, 19, 280/12 AB; 224/7 R, 7 A, 7 B, 921

[56] References Cited
U.S. PATENT DOCUMENTS

| D. 191,832 | 11/1961 | Greenberg | 280/18 |
| 3,222,080 | 12/1965 | Kinraide | 280/18 |
| 3,319,972 | 5/1967 | Gallaher | 280/18 |
| 3,374,003 | 3/1968 | Fulrom | 280/18 |
| 3,547,456 | 12/1970 | Sapp | 280/19 |
| 3,666,282 | 5/1972 | Buening et al. | 280/18 |
| 3,771,808 | 11/1973 | Duerrt | 280/19 |
| 4,046,393 | 9/1977 | Vadnair | 280/19 |

Primary Examiner—David M. Mitchell
Attorney, Agent, or Firm—Harpman & Harpman

[57] ABSTRACT

A game transportation device comprises a thin, flexible sheet, plastic sled upon which an animal can be secured by straps, and a harness attached to the sled for pulling the same along the ground. Downwardly movable ground engaging flaps are provided to prevent backward movement of the sled on an incline.

3 Claims, 5 Drawing Figures

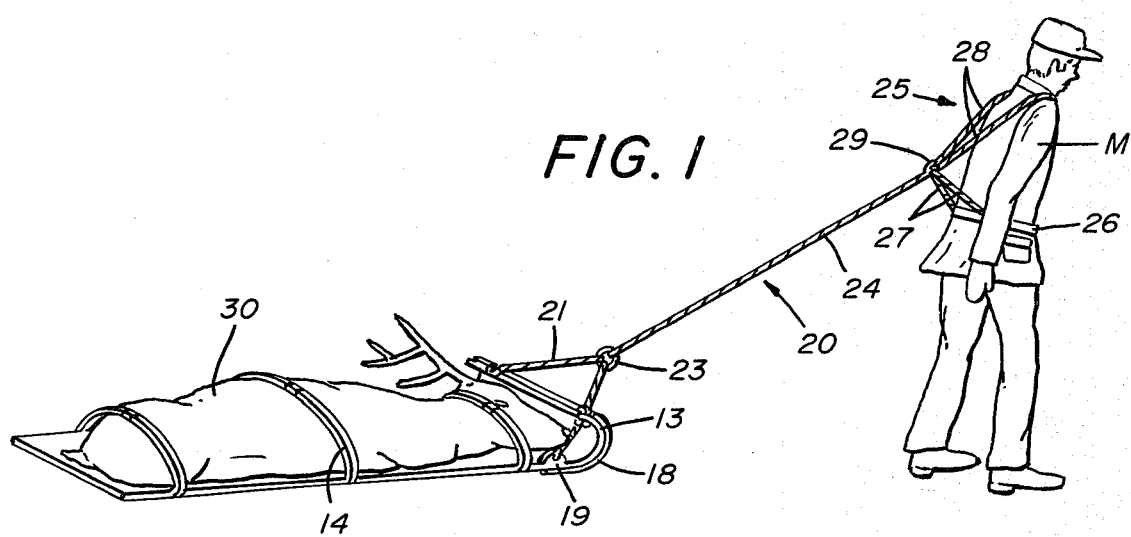
FIG. 1
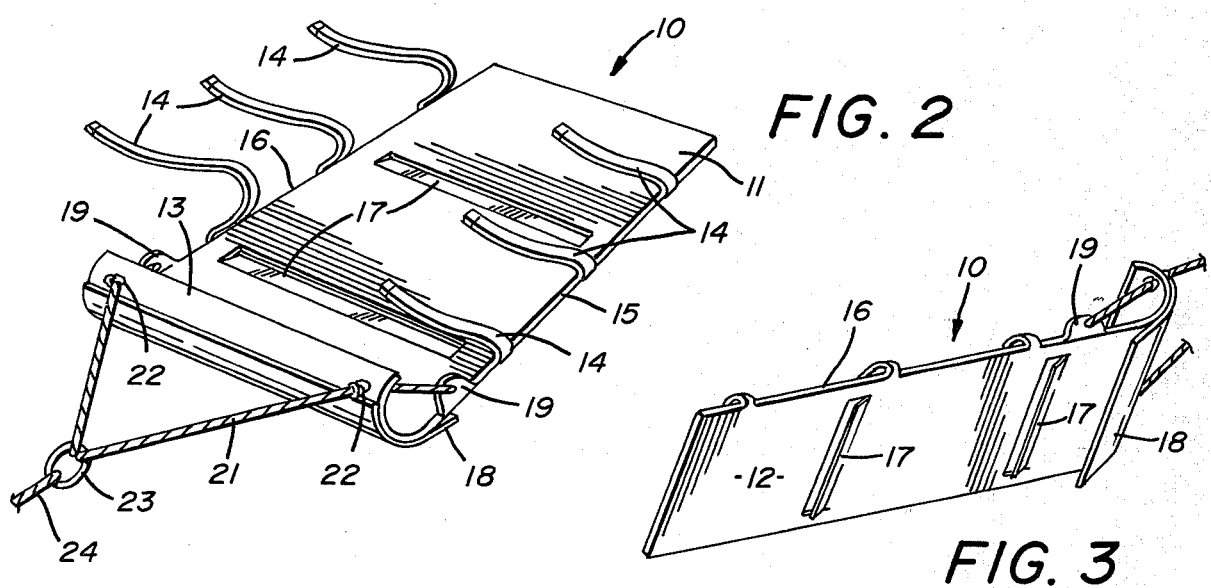
FIG. 2
FIG. 3
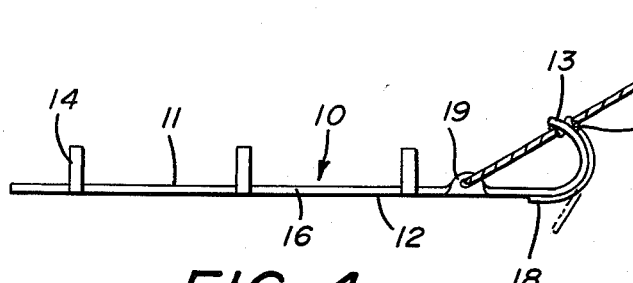
FIG. 4
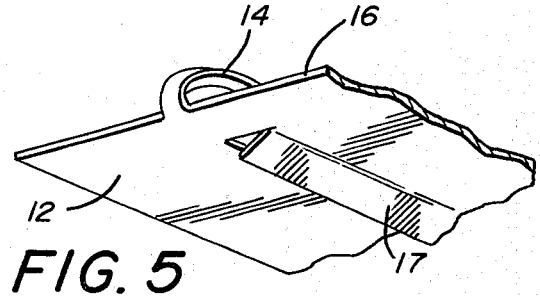
FIG. 5

GAME TRANSPORTATION DEVICE

BACKGROUND OF THE INVENTION (1) Field of the Invention

This invention relates to portable game transportation devices as used by hunters to move an animal carcass from the field.

(2) Description of the Prior Art

The prior art discloses a number of devices to move animals such as seen in U.S. Pat. No. 3,547,456, U.S. Pat. No. 3,771,808 and U.S. Pat. No. 4,046,393.

In U.S. Pat. No. 3,547,456, a game transport is disclosed having a rectangular enclosure which is fastened around the animal and pulled by straps.

U.S. Pat. No. 3,771,808 discloses a portable skid having a flat flexible body that forms an elongated U-shape around the animal.

In U.S. Pat. No. 4,046,393 a portable plastic sled for rescuing injured persons has a rigid towing bar assembly and a rigid plastic support bar positioned along the leading edge of the sled.

Applicant's device has a flexible sheet plastic rectangular body member with spring-like downwardly extending flaps that prevent undesirable backward movement of the device on sloping terrain. An attached harness is used to hold the upturned front edge portion in elevated relation for easier pulling through deep snow and the like.

SUMMARY OF THE INVENTION

A game transportation device for use by hunters to move game, such as deer, from the field and comprising a rectangular piece of flexible plastic material forming a sled that game can be easily placed on.

A number of integral straps along the longitudinal edges are used to secure the game to the sled. A reinforcing front memeber also acts as a ground engaging brake and additional spring-like flaps are integrally formed in the sled material itself. A harness is secured to the front of the sled to hold it in upright position and impart pulling motion.

DESCRIPTION OF THE DRAWINGS

FIG. 1 is a perspective view of the device in use;

FIG. 2 is a top perspective view thereof;

FIG. 3 is a bottom perspective view thereof;

FIG. 4 is a side view; and

FIG. 5 is an enlarged detail showing one of the bottom brake flaps of the device.

DESCRIPTION OF THE PREFERRED EMBODIMENT

As seen in FIGS. 2 and 3 of the drawings, a game transportation device comprises a sled 10 of semi-flexible sheet plastic material having a length greater than its width with a top surface 11 and a bottom surface 12. The plastic material has a molecular memory so as to lay flat on the ground except for a front edge portion 13 which is curled upwardly.

A plurality of spaced integrally formed straps 14 extend from longitudinal edges 15 and 16 of the sled 10. A pair of spaced spring-like transverse slats 17 are formed of the plastic material of the sled 10 between the longitudinal edges 15 and 16 to provide ground engaging brakes against backward movement of the sled 10. A semi-rigid thin plastic member 18 is secured to the sled 10 at a point along the curled front edge portion 11 and freely extends down along the bottom surface 12 a short distance acting as a supplemental support and additional ground engaging brake for the sled 10.

A pair of oppositely disposed apertured tabs 19 are integrally formed on the longitudinal edges 15 and 16 adjacent the curved front edge portion 13.

Referring now to FIGS. 1, 2 and 4 of the drawings, a towing harness assembly 20 will be seen to comprise a rope 21 tied at both of its ends to said apertured tabs 19 and positioned through a pair of spaced apertures 22 in the curved front edge portion 13 and secured thereto.

A connecting ring 23 is engaged on the rope 21 and on a secondary rope 24 which extends to a harness assembly 25 as best seen in FIG. 1 of the drawings. The harness assembly 25 comprises a belt 26 having straps 27 and 28 extending therefrom. The ends of the strap 27 are secured in spaced relation to the belt 25. The strap 28 is attached at its ends to the belt 26. As positioned the strap 28 extends over the shoulder of a person M to a secondary connecting ring 29. The strap 27 extends from the belt 26 through the secondary connecting ring 29. The secondary connecting ring 29 is fastened to the other end of said secondary rope 24 thereby completing the towing assembly 20.

During use a deer 30 or other large game animal is placed on the extended sled 10 and held thereon by the straps 14. The towing assembly 20 and harness 25 are secured to the person M. The manner in which the straps 27 and 28 are arranged allow for complete freedom of movement of the person's arms which is required when traveling in rugged terrain.

As seen in FIG. 1 of the drawings, the weight of the deer 30 and the forward movement of the sled 10 causes the spring-like flaps 17 and the freely extending portion of said semi-rigid member 18 to flatten against the bottom surface 12 of the sled 10. When the forward movement of the sled 10 stops on upsloping terrain, the weight of the deer 30 initially moves the sled 10 backwards thereby permitting the flaps 17 and semi-rigid member 18 to extend downwardly as in FIG. 3 thus preventing the sled from moving backwards.

It will thus be seen that a new and useful device has been disclosed and although one embodiment of the present invention has been illustrated and described, it will be apparent to those skilled in the art that various changes and modifications may be made therein without departing from the spirit of the invention and having thus described my invention what I claim is:

1. A game transportation device comprising a section of semiflexible sheet plastic material having a length greater than its width, one end of said section of material being curled upwardly, at least one pair of apertured tabs formed on the longitudinal edges of said section of material inwardly of said upwardly curved end, a semi-rigid thin plastic rectangular member attached to said upwardly curled end so as to conform therewith with one of its transverse edges extending below the plane of said section of material, a piece of rope attached at its ends to said apertured tabs and engaged in openings in said upwardly curved end and secured thereto, a second rope attached at one of its ends to said first mentioned rope so as to extend outwardly therefrom and a harness on the other end of said secondary rope.

2. The game transportation device of claim 1 and wherein at least one spring-like transverse slat is formed of said plastic material inwardly of the longitudinal edges thereof to act as a ground engaging one-way brake, said transverse slat being joined at one of its longitudinal edges to said section of plastic material.

3. The game transportation device of claim 1 and wherein several straps are attached to the longitudinal edges of said section of material in oppositely disposed relation to one another.

* * * * *